United States Patent
Vasilieff et al.

(10) Patent No.: US 9,318,129 B2
(45) Date of Patent: Apr. 19, 2016

(54) SYSTEM AND METHOD FOR ENHANCING SPEECH ACTIVITY DETECTION USING FACIAL FEATURE DETECTION

(75) Inventors: Brant Jameson Vasilieff, Glendale, CA (US); Patrick John Ehlen, San Francisco, CA (US); Jay Henry Lieske, Jr., Los Angeles, CA (US)

(73) Assignee: AT&T Intellectual Property I, LP, Atlanta, GA (US)

(*) Notice: Subject to any disclaimer, the term of this patent is extended or adjusted under 35 U.S.C. 154(b) by 459 days.

(21) Appl. No.: 13/184,986

(22) Filed: Jul. 18, 2011

(65) Prior Publication Data

US 2013/0021459 A1    Jan. 24, 2013

(51) Int. Cl.
*H04N 7/18* (2006.01)
*G10L 25/78* (2013.01)
*G10L 15/20* (2006.01)
*H04N 1/00* (2006.01)

(52) U.S. Cl.
CPC ............ *G10L 25/78* (2013.01); *H04N 1/00403* (2013.01)

(58) Field of Classification Search
CPC .......... H04N 7/18; H04N 5/225; H04N 7/15; H04N 7/10; G06K 9/00; G06K 9/36; G06K 9/46; G10L 21/00; G10L 15/00; G10L 15/20; G01C 21/00; H04W 88/00
USPC .............. 348/77, E07.085, 92; 382/195, 118, 382/159, 202, 193; 707/270; 704/270
See application file for complete search history.

(56) References Cited

U.S. PATENT DOCUMENTS

| | | | | |
|---|---|---|---|---|
| 5,680,481 A * | 10/1997 | Prasad et al. | | 382/190 |
| 5,774,591 A * | 6/1998 | Black et al. | | 382/236 |
| 7,246,058 B2 | 7/2007 | Burnett | | |
| 7,343,289 B2 * | 3/2008 | Cutler | | G10L 15/25 704/259 |
| 7,362,350 B2 * | 4/2008 | Cutler | | H04N 7/147 348/14.08 |
| 7,369,951 B2 * | 5/2008 | Blosser et al. | | 702/74 |
| 7,433,484 B2 | 10/2008 | Asseily et al. | | |
| 7,577,522 B2 * | 8/2009 | Rosenberg | | 701/433 |
| 8,364,486 B2 * | 1/2013 | Basir | | G10L 15/02 704/251 |
| 2003/0018475 A1 * | 1/2003 | Basu et al. | | 704/270 |

(Continued)

OTHER PUBLICATIONS

Cutler, R., Davis, L.: Look who's talking: Speaker detection using video and audio correlation. In: *IEEE International Conference on Multimedia and Expo*, pp. 1589-1592. New York City (2000).

*Primary Examiner* — Chikaodili E Anyikire
*Assistant Examiner* — Dramos I Kalapodas
(74) *Attorney, Agent, or Firm* — Guntin & Gust, PLC; Andrew Gust

(57) ABSTRACT

Disclosed herein are systems, methods, and non-transitory computer-readable storage media for processing audio. A system configured to practice the method monitors, via a processor of a computing device, an image feed of a user interacting with the computing device and identifies an audio start event in the image feed based on face detection of the user looking at the computing device or a specific region of the computing device. The image feed can be a video stream. The audio start event can be based on a head size, orientation or distance from the computing device, eye position or direction, device orientation, mouth movement, and/or other user features. Then the system initiates processing of a received audio signal based on the audio start event. The system can also identify an audio end event in the image feed and end processing of the received audio signal based on the end event.

21 Claims, 8 Drawing Sheets

(56) References Cited

U.S. PATENT DOCUMENTS

| | | | |
|---|---|---|---|
| 2003/0123754 A1* | 7/2003 | Toyama | 382/291 |
| 2003/0197608 A1* | 10/2003 | Rudhard et al. | 340/539.18 |
| 2004/0267536 A1 | 12/2004 | Hershey et al. | |
| 2006/0031067 A1 | 2/2006 | Kaminuma | |
| 2008/0017547 A1* | 1/2008 | Burns et al. | 206/711 |
| 2008/0071547 A1* | 3/2008 | Prieto et al. | 704/275 |
| 2008/0144886 A1* | 6/2008 | Pryor | 382/103 |
| 2008/0235026 A1* | 9/2008 | Garratt | G10L 15/26 704/270 |
| 2008/0292146 A1* | 11/2008 | Breed et al. | 382/118 |
| 2008/0306733 A1 | 12/2008 | Ozawa | |
| 2009/0125401 A1* | 5/2009 | Beenau et al. | 705/14 |
| 2011/0059798 A1* | 3/2011 | Pryor | 463/37 |
| 2011/0143811 A1* | 6/2011 | Rodriguez | 455/556.1 |
| 2011/0161076 A1* | 6/2011 | Davis | G06F 3/04842 704/231 |
| 2011/0170746 A1* | 7/2011 | Pryor | 382/103 |
| 2011/0184735 A1 | 7/2011 | Flaks et al. | |
| 2011/0216153 A1* | 9/2011 | Tasker | H04N 7/147 348/14.02 |
| 2011/0257971 A1* | 10/2011 | Morrison | G06K 9/00221 704/233 |
| 2013/0218563 A1* | 8/2013 | Basir | G10L 15/02 704/254 |

\* cited by examiner

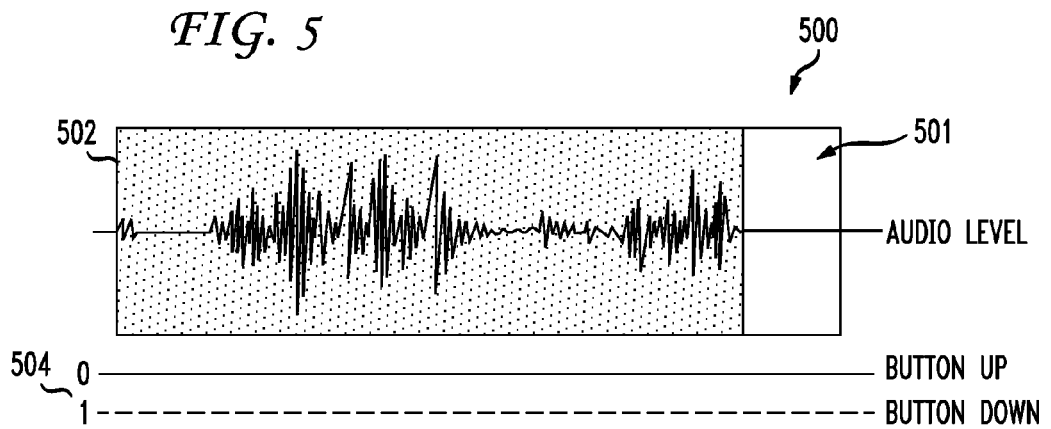
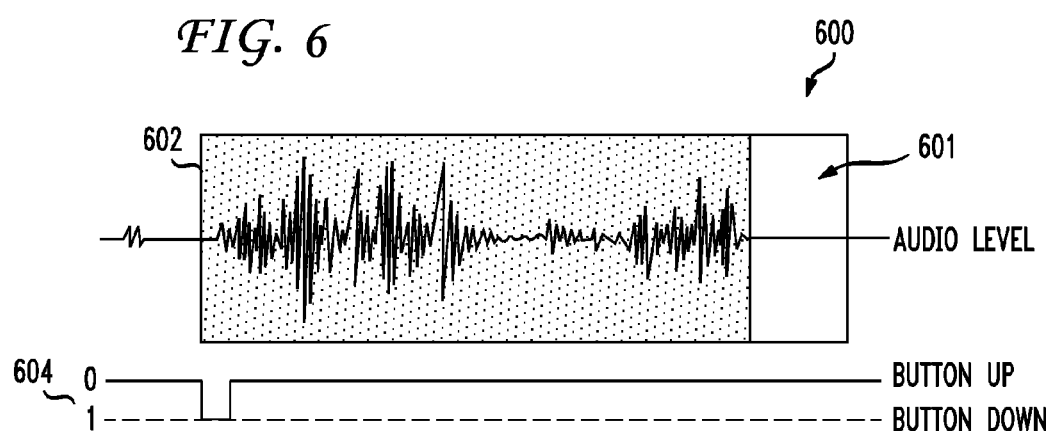
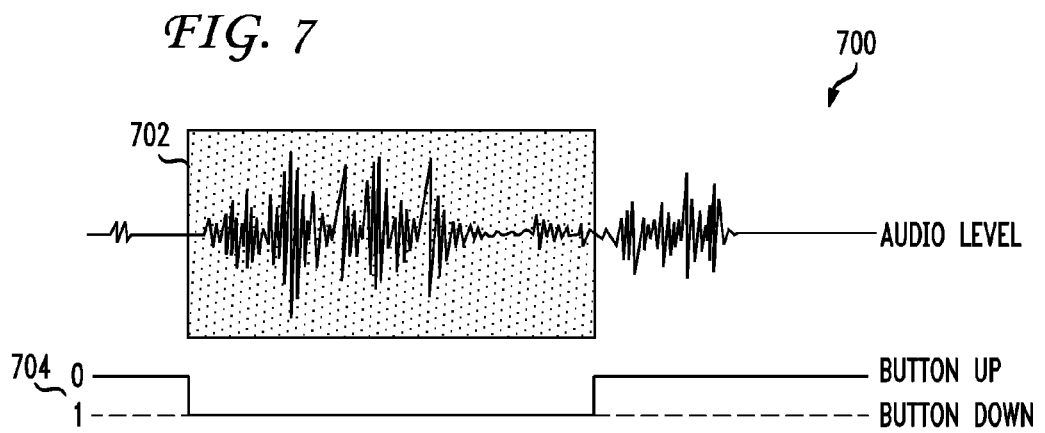

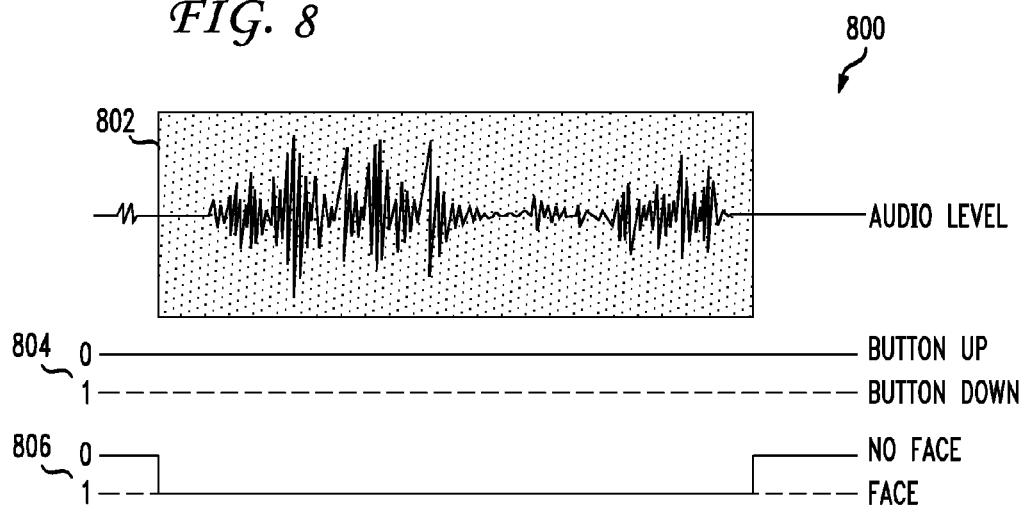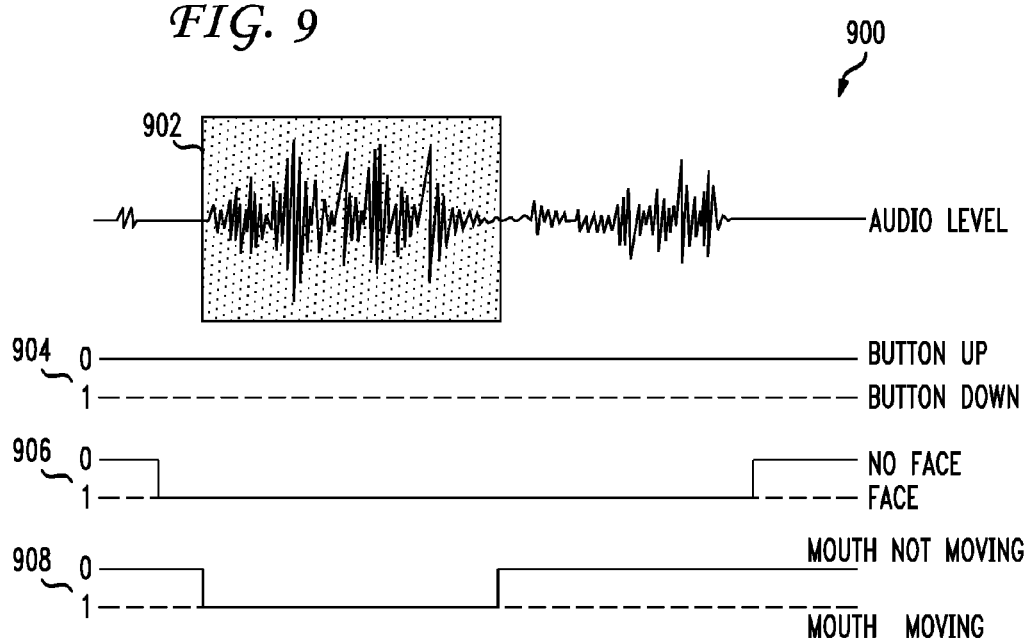

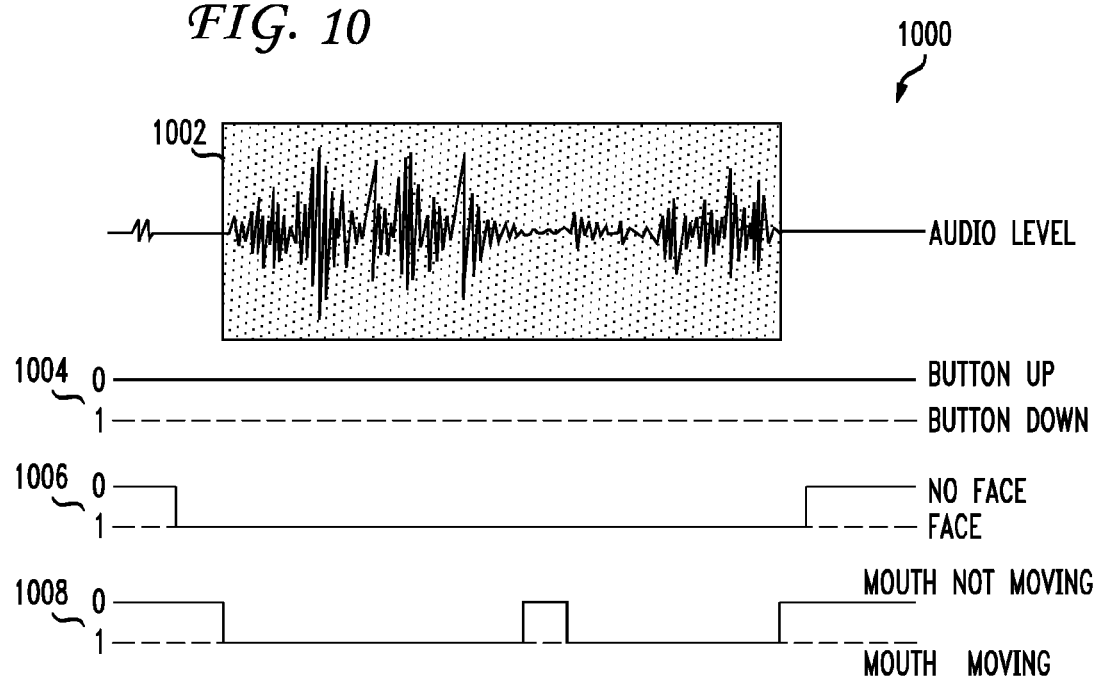

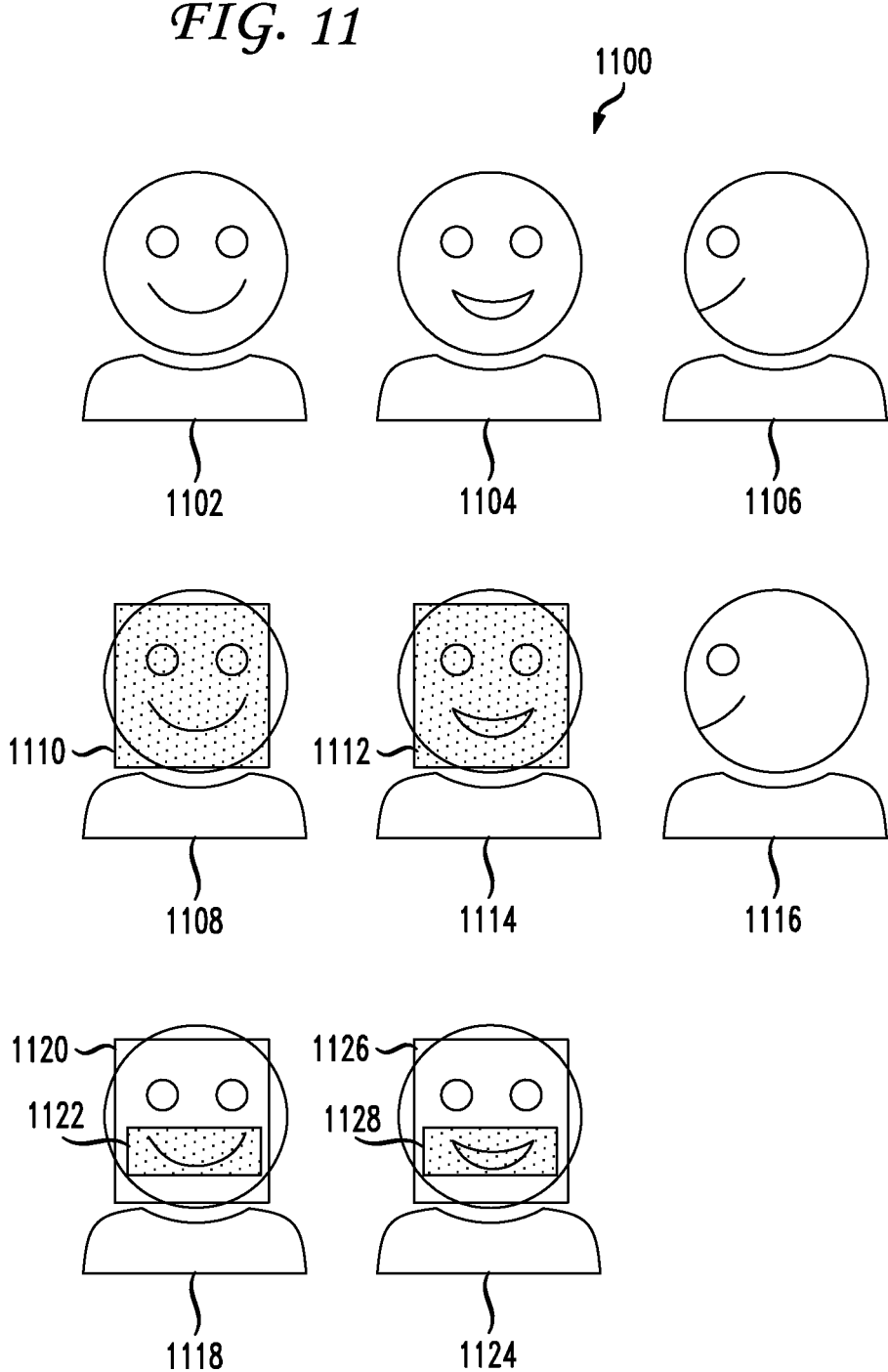

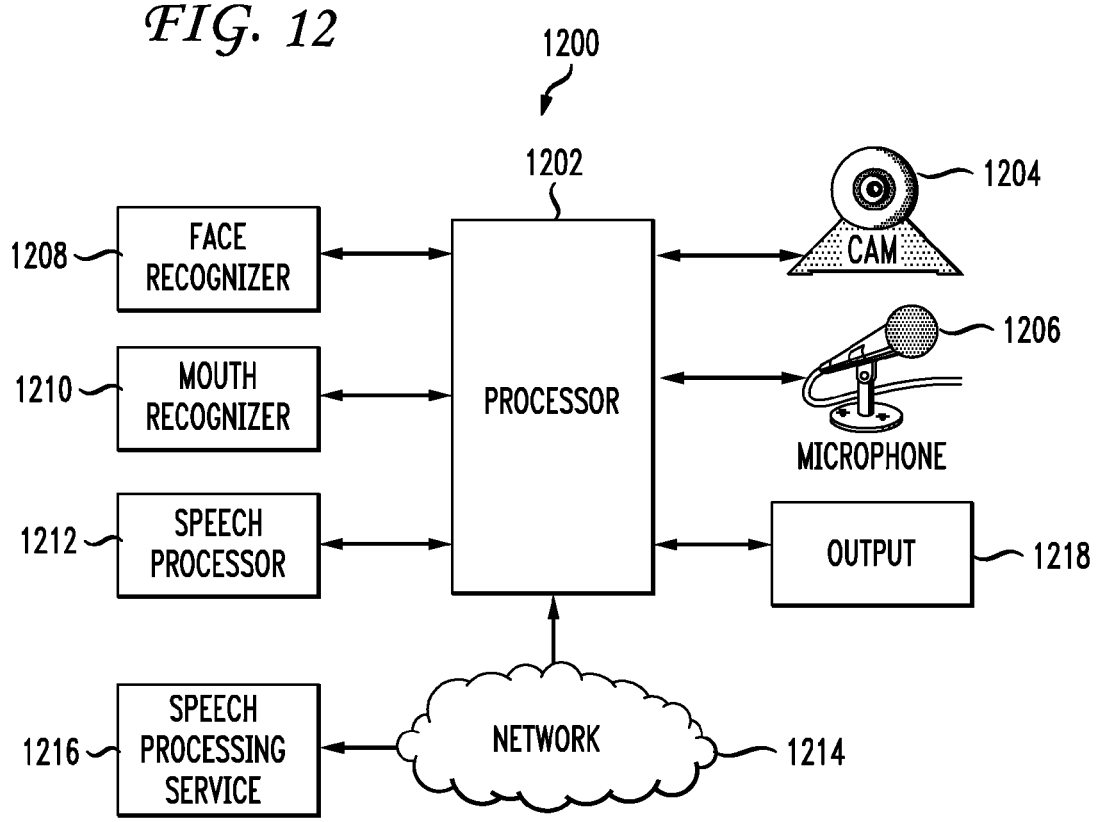

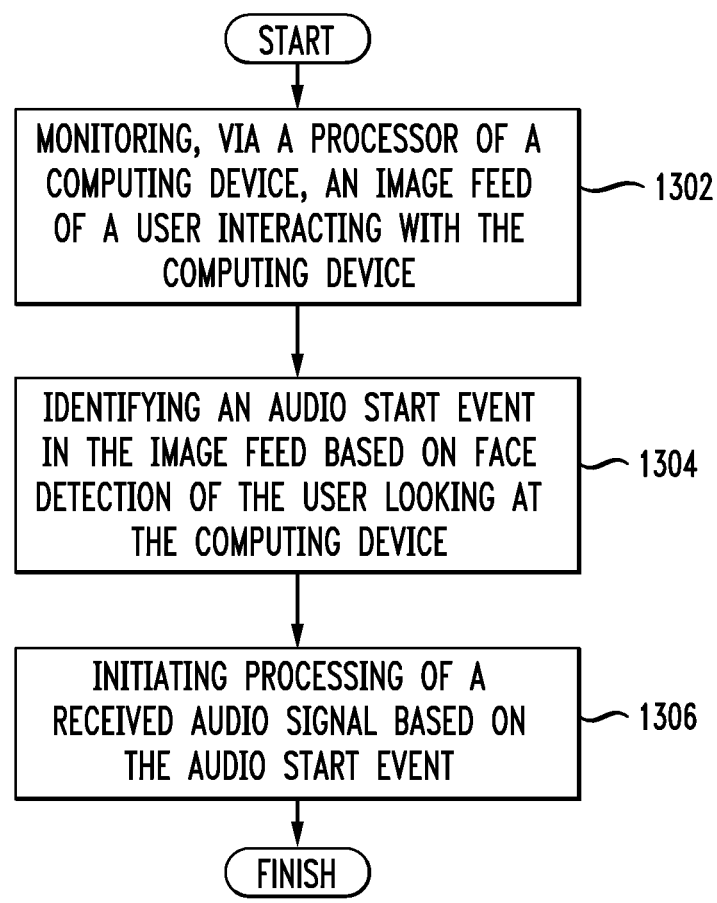

SYSTEM AND METHOD FOR ENHANCING SPEECH ACTIVITY DETECTION USING FACIAL FEATURE DETECTION

BACKGROUND

1. Technical Field

The present disclosure relates to speech processing and more specifically to detecting speech activity based on facial features.

2. Introduction

Many mobile devices include microphones, such as smartphones, personal digital assistants, and tablets. Such devices can use audio received via the microphones for processing speech commands. However, when processing speech and transcribing the speech to text, unintended noises can be processed into ghost words or otherwise confuse the speech processor. Thus, the systems can attempt to determine where the user's speech starts and stops to prevent unintended noises from being accidentally processed. Such determinations are difficult to make, especially in environments with a significant audio floor, like coffee shops, train stations, and so forth, or where multiple people are having a conversation while using the speech application.

To alleviate this problem, many speech applications allow the user to provide manual input, such as pressing a button, to control when the application starts and stops listening. However, this can interfere with natural usage of the speech application and can prevent hands-free operation. Other speech applications allow users to say trigger words to signal the beginning of speech commands, but the trigger word approach can lead to unnatural, stilted dialogs. Further, these trigger words may not be consistent across applications or platforms, leading to user confusion. These and other problems exist in current voice controlled applications.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Facial feature detection can assist in detecting intended start and stop points of speech. Facial feature detection can improve recognition accuracy in environments where the background noise is too loud, the signal-to-noise ratio is too low, two or more people are talking, or a combination of these and other problems. By removing the need to press a button to signal the start and end of speech, a user's hands are freed for other features of the application. Facial feature detection can eliminate the need for trigger words, allowing for more natural commands. Facial feature detection can assist in speech recognition when searching while friends are speaking or the environment is too noisy. The system can initiate listening for a command or operate as a hands-free assistant using these approaches.

Users can signal their intention to interact with the device application by looking at the device. This is similar to people attending to each other's faces during human-human conversation. Facial feature detection provides a natural component of devices where the user looks at the screen while interacting with the application. Facial feature detection can trigger processing of audio based on presence of a face that is looking at the device, optionally within a distance of the screen (calculated based on relative head size), and optionally with detection of mouth movement. These techniques combine to signify to the application the user's intention to interact with the device, and thus the application can process the audio as speech from the user.

This technique is applicable to any device that includes a camera facing the user or otherwise able to obtain images of the user, such as mobile phones, tablets, laptop computers, and desktop computers. These principles can be applied in home automation scenarios for screens embedded in refrigerators, stoves, kitchen cabinets, televisions, nightstands, and so forth. However, the system can also use a device without a camera, by coordinating camera feeds of other devices with a view of the user. For example, the system can coordinate between a user interacting with a tablet computer and a surveillance camera viewing the user. The surveillance camera and associated surveillance components can detect when the user is looking at the tablet computer and when the user's mouth is moving. Then the surveillance system can send a signal to the tablet computer to begin speech processing based on the user's actions. In this way the camera and the actual device with which the user is interacting are physically separate.

Disclosed are systems, methods, and non-transitory computer-readable storage media for processing audio. A system configured to practice the method monitors an image feed of a user interacting with the computing device, and identifies an audio start event in the image feed based on face detection of the user looking at the computing device. The image feed can be a video stream or a series of still images, for example. The user can look at a specific region of the computing device or a portion of the user interface on a display of the computing device. The audio start event can be based on a head size of the user in the image feed, head orientation, head distance from the computing device, eye position, eye direction, device orientation, mouth movement, and/or other user features.

The system can detect mouth movement using modest amounts of computer resources, making these approaches available for use on computer resource constrained hardware such as mobile phones. Mouth movement detection is not necessarily tied to the use of facial feature detection as a speech trigger and can be used in other applications. Conversely, facial feature detection can be used without mouth movement detection.

Then, based on the audio start event, the system initiates processing of a received audio signal. The system can process the received audio signal by performing speech recognition of the received audio signal. The system can pass the audio signal to a remote device, such as a network-based speech recognition server, for processing. The system can record or receive the audio signal before the audio start event, but ignore or discard portions of the audio signal received prior to the audio start event.

The system can optionally identify an audio end event in the image feed, and end processing of the received audio signal based on the end event. The system can identify the audio end event based on the user looking away from the computing device and/or ending mouth movement of the user. Detection of the audio end event can be based on a different type of user face detection from that used for the audio start event.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an example representation of starting and stopping audio based on an audio level;

FIG. 6 illustrates an example representation of starting and stopping audio based on a button press and an audio level;

FIG. 7 illustrates an example representation of starting and stopping audio based on a button press;

FIG. 8 illustrates an example representation of starting and stopping audio based on face attention;

FIG. 9 illustrates a first example representation of starting and stopping audio based on face attention and mouth movement;

FIG. 10 illustrates a second example representation of starting and stopping audio based on face attention and mouth movement;

FIG. 11 illustrates examples of face detection and mouth movement detection;

FIG. 12 illustrates an example audio processing system; and

FIG. 13 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improving speech and audio processing. A brief introductory description of a basic general purpose system or computing device in FIG. 1 which can be employed to practice the concepts is disclosed herein. A more detailed description of speech processing and related approaches will then follow. Multiple variations shall be discussed herein as the various embodiments are set forth. The disclosure now turns to FIG. 1.

Figure 1:
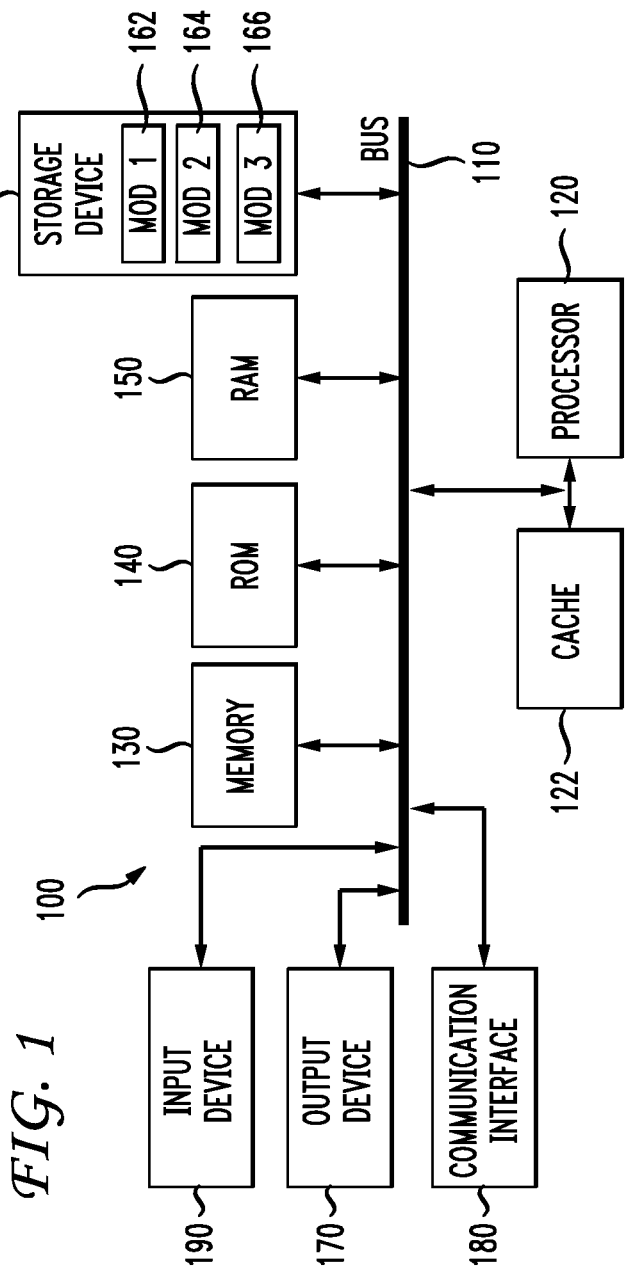
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input, sometimes simultaneous, to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
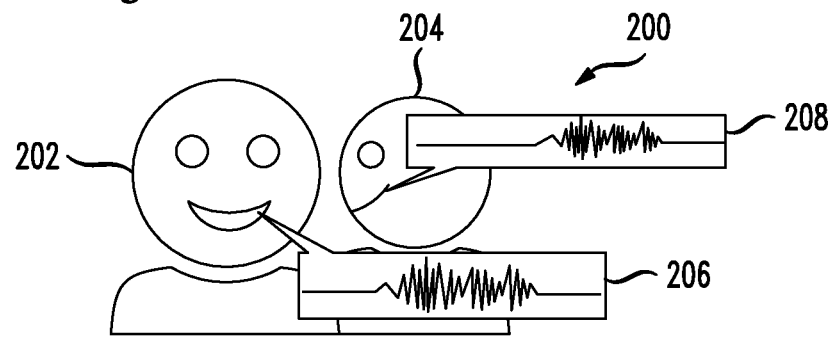
FIG. 2 illustrates two individuals speaking.
Figure 3:
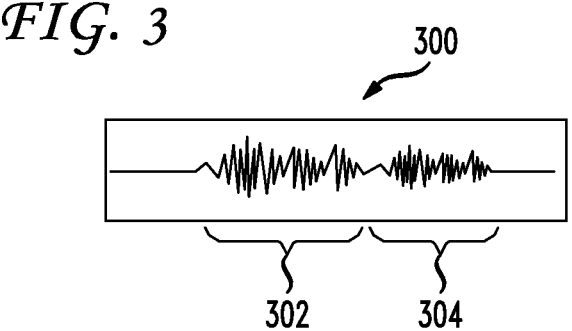
FIG. 3 illustrates an example representation of the two individuals speaking.

Having disclosed some components of a computing system, the disclosure now returns to a discussion of processing speech. When using a voice-enabled application with other people in the vicinity, the voice processing system can become confused about which audio input to use, when to begin audio processing and when to end audio processing. The system can often improperly and inadvertently include part of a follow up conversation. Facial feature detection can solve this problem. FIG. 2 illustrates a scenario 200 where two individuals, Sally 202 and Tom 204, are having a conversation. Sally 202 shows Tom 204 how to search for a pizza place near the Empire State Building. Sally 202 says "Pizza near the Empire State Building", represented by a first wave form 206. Tom 204 responds "Wow, so you just ask it a question?", represented by a second wave form 208. The device hears continuous audio from the beginning of Sally 202 speaking until Tom 204 finishes speaking Thus, FIG. 3 shows the combined audio 300 detected by the device: "pizza near the empire state building wow so you can just ask it a question". The combined audio includes Sally's speech 302 and Tom's speech 304 in a single audio input. The system will encounter difficulty fitting the combined audio 300 into an intended speech recognition grammar. With facial feature detection for generating start and end points, the system can determine when Sally 202 is speaking rather than Tom 204 and can determine which audio to process and which audio to ignore.

In an environment with too much background noise, audio levels alone are insufficient to indicate when a user has stopped speaking. The system can rely on facial feature detection identifying when a user's mouth is moving to determine when to start and/or stop listening for audio. The device can ignore audio received when the user is not looking at the device and/or if the user's lips are not moving. This approach can eliminate the need for trigger words.

Figure 4:
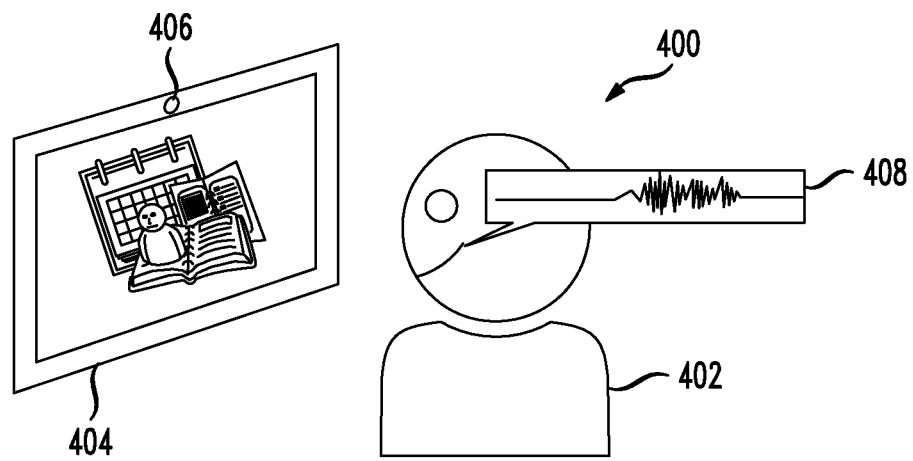
FIG. 4 illustrates an example user voice interaction with a hands-free appliance.

FIG. 4 illustrates an example scenario 400 of a user 402 interacting via voice with a hands-free appliance 404, such as a tablet, an in-appliance display, or a blender. A kitchen appliance or home automation system can relax the requirement for either a button press or a specific trigger phrase when a speaker's face is detected in front of the control panel. The appliance 404 includes a sensor bundle 406, such as a camera and a microphone. When the camera detects that the user 402 is looking at the appliance 404, the appliance 404 can engage the microphone or begin actively monitoring received audio, such as speech commands 408 from the user 402. When the user 402 looks away from the appliance 404, the appliance 404 can disengage the microphone or stop monitoring the audio.

The disclosure now turns to a discussion of triggers for audio processing. Different types of triggers can be used in virtually any combination, including face attention, mouth movement detection, audio levels, and button presses.

FIG. 5 illustrates an example representation 500 of starting and stopping audio based on an audio level alone. The wave form 502 represents speech input and a period of no audio at the end, indicating the end of the audio input. The system treats the period of no audio at the end 501 as a stop trigger. A timeline of button presses 504 indicates that no button input was provided as a trigger. In this configuration, the system continuously captures and analyzes levels of the audio. The speech recognizer signals when to start processing an audio request for spoken commands based on the audio alone. This works well in quiet locations that do not have competing conversations that may cause unwanted input.

FIG. 6 illustrates an example representation 600 of starting and stopping audio based on a button press and an audio level. The wave form 602 represents speech input. A timeline of button presses 604 indicates that a button input is the start trigger. A period of no audio at the end 601 indicates the end of the audio input. The system treats the period of no audio at the end as a stop trigger. The user can press a button to trigger when to start listening while still relying on audio to indicate when to finish listening to more clearly indicate when a user intends to issue a verbal request. While eliminating false starts, nearby conversations can cause unwanted extra audio in speech processing, which can cause problems when converting the audio to speech using a speech recognition grammar.

FIG. 7 illustrates an example representation 700 of starting and stopping audio based on a button press. The wave form 702 represents speech input. A timeline of button presses 704 indicates that pressing the button down is the start trigger and releasing the button is the end trigger. In noisy environments, the noise floor may be too high and the signal to noise ratio too low to reliably detect the end of the spoken request. In these cases, the user can click a separate start button and end button, click the same button two times, or can hold the button for the duration of the desired speech. This is a modal approach and does not allow for hands-free operation. For example, typing on a keyboard or interacting with other graphical user interface elements would be difficult while pressing and holding a button.

FIG. 8 illustrates an example representation 800 of starting and stopping audio based on face attention. The wave form 802 represents speech input. A timeline of button presses 804 indicates that the button is not pressed. A timeline of face detection 806 indicates that detecting a face is the start trigger, and detecting departure of that face is the end trigger. The presence of a face looking at a camera, screen, or in another direction can trigger audio processing.

FIG. 9 illustrates a first example representation 900 of starting and stopping audio based on face attention and mouth movement. The wave form 902 represents speech input. A timeline of button presses 904 indicates that the button is not pressed. A timeline of face detection 906 shows when a face is detected. A timeline of mouth movement 908 shows that a combination of a detected face and mouth movement is the start trigger, and the termination of either the mouth movement or the detected face is the end trigger. In this example, the two large sections of speech in the wave form 902 are Sally and Tom speaking By including mouth movement detection, the system can ignore the audio utterance from Tom because Sally's mouth is not moving.

FIG. 10 illustrates a second example representation 1000 of starting and stopping audio based on face attention and mouth movement. The wave form 1002 represents speech input. A timeline of button presses 1004 indicates that the button is not pressed. A timeline of face detection 1006 shows when a face is detected. A timeline of mouth movement 1008 shows that a combination of a detected face and mouth movement is the start trigger, and the termination of either the mouth movement or the detected face is the end trigger. In this example, the two large sections of speech in the wave form 902 are both from Sally speaking. By including mouth movement detection, the system can focus specifically on the audio utterances from Sally because her mouth is moving and ignore the other portions of the audio. If two regions of speech are closer than a maximum threshold distance, the system can merge the two regions of speech. For example, the system can merge the two separate regions, effectively ignoring the brief middle period where the system did not detect mouth movement.

In these examples, the system can process audio data locally, and, upon receiving a start trigger, can upload the speech data to a server for more rigorous or robust processing. The system can process audio data that occurred before the start trigger and after the end trigger. For example, a user may begin to speak a command and look at the camera halfway through the command. The system can detect this and use the triggers as general guides, and not necessarily absolute position markers, to select and identify audio data of interest for speech processing.

FIG. 11 illustrates examples of face detection and mouth movement detection. The detection of face attention can include the presence of a face in a camera feed and an orientation of the face. Face detection can include where the eyes are looking as well as additional tracking and visual feedback. The system can successfully detect face attention when the face is head on, looking at the camera or in another appropriate direction. Face 1102 provides one example of a face looking at the camera head on. Face 1104 provides an example of a face looking at the camera head on with the mouth open, indicating mouth motion. Face 1106 provides an example of a face looking away from the camera. The system can implement one or more face detection algorithm to detect faces and face attention.

A face detection module can take a video or image feed as input and provide an output whether a face exists, whether the face is looking at the camera, and/or whether the mouth is moving. The face detection module can optionally provide a certainty value of the output. The speech processor can then use that certainty value to determine whether or not the audio associated with the certainty value is intended for recognition. A face detection module can also output or identify regions 1110, 1114 in the video or image feed containing faces looking at the camera, as shown in faces 1108, 1112, 1116. Further, the face detection module can identify and indicate mouths. Face 1118 shows a box 1120 indicating a detected face and a box 1122 indicating a detected closed mouth. Face 1124 shows a box 1126 indicating a detected face and a box 1128 indicating a detected open mouth. The face detection module can also provide an indication of whether the mouth is open or closed, or whether the mouth is moving or not moving.

Conventional techniques of detecting the outline of the mouth, converting it into control points, and tracking the points over time may require too much processing power and may significantly reduce battery life on many mobile devices. Several techniques can streamline how the system detects mouth movement. The system can use these techniques in facial feature detection for triggering speech recognition and/or in other scenarios.

The application can use standard face detection to determine a face bounding rectangle. The optimized mouth region of interest (ROI) is to look at the bottom third and inset further on the edges. This ROI is expected to contain the significant visual data that changes as the person speaks. On a fixed camera, the location of the found face can change as the user moves along the plane perpendicular to the camera's z-axis, and the size changes due to moving towards or away from the camera along the z-axis. With a moving camera, the found rectangle can change in other ways from frame to frame. The background can change as well.

For each new frame or image, the system can compare the mouth ROIs over time to calculate a volatility of how much the ROI changes. The system can compare that volatility with a trigger threshold indicating mouth movements. The system can also consider motion velocity within the ROI. The system can calculate the optical flow in the ROI between successive frames. The system can square and average the velocities of the pixels. Then the system can test the delta or different from the running average against a threshold that indicates enough volatility for mouth movement.

The system can also generate a volatility histogram representing change for the ROI. The system can calculate a histogram for each frame and then take a delta or difference between the histogram of the current frame and the histogram for the last frame. The system can then sum and average the delta values or sum and average their squares. The system compares the value to a threshold that represents significant enough volatility in the histogram changes. If needed, the system can use a low pass filter on the running average, where larger deltas from the average indicate volatility.

The system can calculate volatility in average color for the ROI by summing the color values (or square of the color values) in the ROI and averaging the color values. The system calculates the average for each frame, and calculates a delta value. The system takes a running average. Using a low pass filter, the system can look for larger deltas from the average to indicate volatility.

Various settings and threshold values for face and mouth movement detection can be obtained via dual training sets. For example, a training system can perform two passes of face detection, with a first trained set for closed mouths and a second trained set for open mouths. The system can rate mouth movement as the volatility of change between a set containing a face.

Likewise, a linear model solution may be used to integrate many of the aforementioned approaches into a single model of user speech activity. Such a linear model would produce a binary criterion for whether or not a user is in a state of speaking to the system, represented as the sum of products of factor values and coefficients that weight the salience of each of those factors to the criterion. Those factors may include but are not limited to metrics of audio activity level, face detection probability, head pose estimation, mouth y-axis pixel deltas, ratio of y-axis pixel deltas to x-axis pixel deltas, and other measurable visual and auditory cues. The coefficients that weight those factors could be determined by stepwise regression or other machine learning techniques that use data collected from human-annotated observations of people speaking to devices in similar or simulated circumstances.

FIG. 12 illustrates an example audio processing system 1200. A processor 1202 receives image data via a camera 1204 and audio data via a microphone 1206. The camera 1204 and/or the microphone 1206 can be contained in the same device as the processor 1202 or a different device. The system can include multiple cameras to view the user from different angles and positions. The system can use image data received from cameras external to the system, such as surveillance cameras or cameras in other devices.

The processor 1202 receives the image data and passes the image data to a face recognizer 1208 and/or a mouth recognizer 1210. The face recognizer 1208 and mouth recognizer 1210 process the image data and provide a trigger or notification to the processor 1202 when a face directed to the camera with a moving mouth is detected. Upon receiving a trigger or notification, the processor 1202 passes audio data received via the microphone 1206 to a speech processor 1212 or to a speech processing service 1216 via a network 1214, which provide speech recognition results to the processor 1202. The processor can also provide a signal to the speech processor 1212 or the speech processing service 1216 when the face moves away from the camera and/or when the mouth stops moving. The processor uses the speech recognition results to drive output 1218 to the user. For example, the processor can provide the speech recognition text on a display to the user. Alternatively, the processor can interpret the speech recognition text as a command, take an action based on the command, and output the results of that action to the user via a display, a speaker, a vibrating motor, and/or other output mechanisms. In one aspect, the system provides output 1218 to the user indicating that the system is triggered into a speech processing mode. For example, the system can illuminate a light-emitting diode (LED) that signals to the user that a face and a moving mouth were detected. In this way, the user can be assured that the system is appropriately receiving, and not discarding or ignoring, the speech command. The system can provide notifications via other outputs, such as modifying an element of a graphical user interface, vibrating, or playing an audible sound.

Having disclosed some basic system components and concepts, the disclosure now turns to the exemplary method embodiment shown in FIG. 13. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The system 100 monitors an image feed of a user interacting with the computing device (1302). The image feed can be a video stream. The system can capture the image feed at video-speed, such as 24 frames per second or more, or can capture the image feed at a lower speed, such as 2 frames per second, to conserve computing resources used for image processing.

The system 100 identifies an audio start event in the image feed based on face detection of the user looking at the computing device (1304). The user looking at the computing device can include a user looking at a specific region of the computing device or graphical user interface of the computing device. The audio start event can be based on a head size of the user in the image feed, head orientation, head distance from the computing device, eye position, eye direction, device orientation, mouth movement, and/or other user features.

Then, based on the audio start event, the system 100 initiates processing of a received audio signal (1306). Processing the audio signal can include performing speech recognition of the received audio signal. Processing the audio signal can occur on a second device separate from the computing device that receives the audio signal. In one aspect, the system receives the audio signal constantly while the device is on, but the device ignores portions of the received audio signal that are received prior to the audio start event.

The system 100 can optionally identify an audio end event in the image feed, and end processing of the received audio signal based on the end event. The system can identify the audio end event in the image feed based on the user looking away from the computing device and/or ending mouth movement of the user. The audio end event can be triggered by a different type from the audio start event.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to speech recognition in any situation, but can be particularly useful when the system processes speech from a user in a noisy environment. Those skilled in the art will readily recognize various modifications and changes that may be made to the principles described herein without following the example embodiments and applications illustrated and described herein, and without departing from the spirit and scope of the disclosure.

We claim:

1. A method for detecting use of a mobile computing device, comprising:
    identifying, a processor of a remote computing device, in an image feed from a surveillance camera:
        a user; and
        the mobile computing device;
    identifying, the remote computing device and within the image feed, an interaction between the user and the mobile computing device;
    receiving, at the remote computing device and while monitoring the image feed, an audio signal having a first voice signal associated with the user and a second voice signal associated with a non-user;
    identifying, at the remote computing device, an audio start event of the first voice signal based on a distance of the user to a screen of the mobile computing device and on mouth movement of the user in the image feed; and
    based on the audio start event, initiating processing of the first voice signal by the processor of the remote computing device.

2. The method of claim 1, wherein the image feed is a video stream.

3. The method of claim 1, wherein the image feed comprises the user looking at a specific region of the mobile computing device.

4. The method of claim 1, wherein the audio start event is further identified based on one of head orientation, eye position, eye direction, device orientation, and other user features.

5. The method of claim 1, further comprising:
    identifying an audio end event in the image feed; and
    ending processing of the first voice signal based on the audio end event.

6. The method of claim 5, wherein identifying of the audio end event in the image feed is based on one of the user looking away from the mobile computing device, a linear model that combines events, and ending mouth movement of the user.

7. The method of claim 5, wherein the audio end event is of a different type from the audio start event.

8. The method of claim 1, wherein processing of the first voice signal comprises performing speech recognition of the first voice audio signal.

9. The method of claim 1, wherein processing of the first voice signal comprises transmitting the first voice signal to a second device separate from the computing device.

10. The method of claim 1, further comprising ignoring a portion of the audio signal that is received prior to the audio start event.

11. A system for detecting use of a mobile computing device comprising:
    a processor; and
    a computer-readable storage medium having instructions stored which, when executed by the processor, cause the processor to perform operations comprising:
        identifying, by a remote computing device, in an image feed from a surveillance camera:
            a user; and
            the mobile computing device;
        identifying, by the remote computing device and within the image feed, an interaction between the user and the mobile computing device;
        receiving, at the remote computing device and while monitoring the image feed, an audio signal having a first voice signal associated with the user and a second voice signal associated with a non-user;
        identifying, at the remote computing device, an audio start event of the first voice signal based on a distance of the user to a screen of the mobile computing device and on mouth movement of the user in the image feed; and
        based on the audio start event, initiating processing of the first voice signal by the remote computing device.

12. The system of claim 11, wherein the image feed is a video stream.

13. The system of claim 11, wherein the image feed further comprises the user looking at a specific region of the mobile computing device.

14. The system of claim 11, wherein the audio start event is based on one of head orientation, eye position, eye direction, device orientation, and a linear model that combines events.

15. A computer-readable storage device having instructions stored for detecting use of a mobile computing device which, when executed by a computing device, cause the computing device to perform operations comprising:
    identifying, a remote computing device, in an image feed from a surveillance camera:
        a user; and
        a mobile computing device;
    identifying, the remote computing device and within the image feed, an interaction between the user and the mobile computing device;
    receiving, at the remote computing device and while monitoring the image feed, an audio signal having a first voice signal associated with the user and a second voice signal associated with a non-user;
    identifying, at the remote computing device, an audio start event of the first voice signal based on a distance of the user to a screen of the mobile computing device and on mouth movement of the user in the image feed; and
    based on the audio start event, initiating processing of the first voice signal by the remote computing device.

16. The computer-readable storage device of claim 15, having additional instructions stored which, when executed by the computing device, result in the operations further comprising:
   identifying an audio end event in the image feed; and
   ending processing of the first voice signal based on the end event.

17. The computer-readable storage device of claim 16, wherein identifying the audio end event in the image feed is based on one of the user looking away from the mobile computing device and ending mouth movement of the user.

18. The computer-readable storage device of claim 16, wherein the audio end event is of a different type from the audio start event.

19. The method of claim 1, wherein the distance of the user to the screen is calculated according to a relative head size of the user.

20. The system of claim 11, wherein the distance of the user to the screen is calculated according to a relative head size of the user.

21. The computer-readable storage device of claim 15, wherein the distance of the user to the screen is calculated according to a relative head size of the user.

* * * * *